US007982917B2

(12) United States Patent
Wicker

(10) Patent No.: US 7,982,917 B2
(45) Date of Patent: Jul. 19, 2011

(54) DOCUMENT CONTAINING SCANNING SURVIVABLE SECURITY FEATURES

(75) Inventor: Thomas M. Wicker, Hemlock, NY (US)

(73) Assignee: Document Security Systems, Inc., Rochester, NY (US)

( * ) Notice: Subject to any disclaimer, the term of this patent is extended or adjusted under 35 U.S.C. 154(b) by 1078 days.

(21) Appl. No.: 11/683,161

(22) Filed: Mar. 7, 2007

(65) Prior Publication Data

US 2007/0246930 A1 Oct. 25, 2007

Related U.S. Application Data

(63) Continuation-in-part of application No. PCT/US2005/031440, filed on Sep. 6, 2005, and a continuation-in-part of application No. 10/895,822, filed on Jul. 22, 2004, now abandoned, which is a continuation of application No. PCT/US03/032159, filed on Oct. 9, 2003.

(60) Provisional application No. 60/795,167, filed on Apr. 27, 2006, provisional application No. 60/607,272, filed on Sep. 7, 2004, provisional application No. 60/655,424, filed on Feb. 24, 2005, provisional application No. 60/417,750, filed on Oct. 10, 2002, provisional application No. 60/417,751, filed on Oct. 10, 2002, provisional application No. 60/417,752, filed on Oct. 10, 2002, provisional application No. 60/417,753, filed on Oct. 10, 2002, provisional application No. 60/417,754, filed on Oct. 10, 2002, provisional application No. 60/417,755, filed on Oct. 10, 2002, provisional application No. 60/417,756, filed on Oct. 10, 2002, provisional application No. 60/417,757, filed on Oct. 10, 2002, provisional application No. 60/417,758, filed on Oct. 10, 2002.

(51) Int. Cl.

| | |
|---|---|
| ***H04N 1/387*** | (2006.01) |
| ***B42D 15/10*** | (2006.01) |
| ***B41M 3/10*** | (2006.01) |
| ***B41M 3/14*** | (2006.01) |

(52) U.S. Cl. .......... 358/3.28; 358/1.14; 283/67; 283/72; 283/113; 283/57; 283/902; 235/494

(58) Field of Classification Search .................. 358/1.9, 358/3.28, 1.14, 474; 283/57, 58, 67, 72, 283/113, 902; 382/100, 135, 137, 173, 176, 382/177, 190, 191, 312; 235/379, 494; 399/366; 347/107

See application file for complete search history.

(56) References Cited

U.S. PATENT DOCUMENTS 3,675,948 A * 7/1972 Wicker (Continued)

FOREIGN PATENT DOCUMENTS

CA 2207127 * 12/1997

(Continued)

*Primary Examiner* — Scott A Rogers

(74) *Attorney, Agent, or Firm* — Stephen B. Salai, Esq.; Thomas B. Ryan; Harter Secrest & Emery LLP

(57) ABSTRACT

A document comprising a latent security image that is visible when the document is reproduced after being scanned by a standard commercial bank scanner. The security image comprises a plurality of lines, dots, or spots having a frequency and a density such that the image is reproduced after being scanned by the standard commercial bank scanner. A method of making a reproducible document comprising a security device comprises generating the document by creating an original containing the security device, scanning the original to a digital computer using a conventional scanner, and converting the scanned original to a digital image file which is printable via a digital press, a color copier, etc. A document comprises a security image that is not visible under ordinary light, and is visible when the document is exposed to a predetermined type of light. The security image is printed with an ink visible under one of UV light, infrared light, X-rays, of Gamma rays.

6 Claims, 3 Drawing Sheets

U.S. PATENT DOCUMENTS

| | | | | | |
|---|---|---|---|---|---|
| 4,143,967 | A | * | 3/1979 | Wicker | |
| 4,227,720 | A | * | 10/1980 | Mowry et al. | |
| 4,310,180 | A | * | 1/1982 | Mowry et al. | |
| 5,018,767 | A | * | 5/1991 | Wicker | |
| 5,149,140 | A | * | 9/1992 | Mowry et al. | |
| 5,171,040 | A | * | 12/1992 | Orndorff | |
| 5,193,853 | A | * | 3/1993 | Wicker | |
| 5,297,815 | A | * | 3/1994 | Anderson | |
| 5,487,567 | A | * | 1/1996 | Volpe | |
| 5,707,083 | A | * | 1/1998 | Wallace | |
| 5,708,717 | A | * | 1/1998 | Alasia | |
| 5,722,693 | A | * | 3/1998 | Wicker | 283/67 |
| 5,788,285 | A | * | 8/1998 | Wicker | |
| 5,951,055 | A | * | 9/1999 | Mowry, Jr. | 283/72 |
| 6,000,728 | A | * | 12/1999 | Mowry | |
| 6,104,812 | A | * | 8/2000 | Koltai et al. | |
| 6,209,922 | B1 | | 4/2001 | Klein | |
| 6,305,718 | B1 | | 10/2001 | Kendrick | |
| 6,692,030 | B1 | | 2/2004 | Phillips | |
| 6,865,001 | B2 | | 3/2005 | Long et al. | |
| 6,966,998 | B1 | | 11/2005 | Spowart | |
| 2003/0030271 | A1 | * | 2/2003 | Wicker | |
| 2005/0225080 | A1 | * | 10/2005 | Wicker | |
| 2007/0029394 | A1 | * | 2/2007 | Wicker | |
| 2007/0201116 | A1 | * | 8/2007 | Wicker et al. | 359/2 |
| 2007/0241554 | A1 | * | 10/2007 | Wicker et al. | 283/93 |
| 2007/0248364 | A1 | * | 10/2007 | Wicker et al. | 399/1 |
| 2007/0257977 | A1 | * | 11/2007 | Wicker et al. | 347/107 |
| 2007/0267865 | A1 | * | 11/2007 | Wicker et al. | 283/73 |

FOREIGN PATENT DOCUMENTS

| | | | | |
|---|---|---|---|---|
| GB | 2217258 | | | 10/1989 |
| WO | WO 90/08046 | | * | 7/1990 |
| WO | WO 03/013870 | A3 | * | 2/2003 |
| WO | WO 93/22145 | | * | 11/2003 |
| WO | WO 2004/033229 | A2 | * | 4/2004 |
| WO | WO 2004/068421 | A2 | * | 8/2004 |
| WO | WO 2004/110773 | A1 | * | 12/2004 |
| WO | WO 2006/001793 | A1 | * | 1/2006 |
| WO | WO 2006/029033 | A2 | * | 3/2006 |
| WO | WO 2007/016536 | A2 | * | 2/2007 |

* cited by examiner

DOCUMENT CONTAINING SCANNING SURVIVABLE SECURITY FEATURES

CROSS-REFERENCE TO RELATED APPLICATIONS

This application is a nonprovisional of U.S. Provisional Application No. 60/795,167, filed on Apr. 27, 2006, and a continuation-in-part of both International Application No. PCT/US2005/031440, filed on Sep. 6, 2005, and U.S. application Ser. No. 10/895,822, filed Jul. 22, 2004, which is a continuation of International Application No. PCT/US2003/032159, filed Oct. 9, 2003, which are all hereby incorporated by reference.

TECHNICAL FIELD

This invention relates generally to document protection methods and products. More particularly, the present invention relates to methods and products for printing and obtaining original documents that contain security features that are present in scanned copies of the document (i.e., security features that survive the scanning process). The present invention further relates to methods and products for creating original documents containing security features as a digital file. Still further, the present invention relates to methods and products for creating original documents containing ultraviolet or infrared invisible security images, allowing detection of a valid original document by a document reader under ultraviolet light.

BACKGROUND OF THE INVENTION

Many methods and products have been developed, for example, to deter counterfeiting of valuable documents or financial instruments such as currency, so that unauthorized copies attempted to be made from those documents can be readily distinguished from the originals. Most of these methods and product involve preparing an original document by printing or lithography on high quality media such as silk, rice paper, and high contact rag paper. The printing of original documents may be done either in black-and-white (B&W) or in color, and if in color, either in spot color, colored backgrounds and/or multicolor printing. In the case of color, the tendency has been in the direction of using multiple colors for original documents for aesthetic value, for ease of recognition, and originally for protection from copying by conventional means. The common printing processes of valuable originals, whether in B&W or in color, are intaglio and gravure, among others. These and the other processes mentioned in this application are very well known in the art and will not be discussed in great detail.

Most of the useful examples in the prior art to deter counterfeiting and the like are intended to ensure that copies are produced either with a distinct moiré distortion or with a "latent image" indicia bearing a warning message which is invisible or nearly invisible to the naked eye on the original document. The term "latent image" is used here not in the photographic sense of an unseen image to be developed after processing by chemical reaction, but to indicate indicia that are printed on originals so as to be nearly invisible to the naked eye.

These and other developments in the prior art for purposes of providing document protection are disclosed in the patent literature, as for example, in U.S. Pat. No. 5,018,767 issued May 28, 1991; U.S. Pat. No. 5,193,853 issued Mar. 16, 1993; and U.S. Pat. No. 3,675,948 issued Jul. 11, 1972; and U.S. Pat. No. 4,143,967 issued Mar. 13, 1979, all to Ralph C. Wicker; in U.S. Pat. No. 4,227,720 issued Oct. 14, 1980 and U.S. Pat. No. 4,310,180 issued Jan. 12, 1982 both to William H. Mowry, et al, as well as U.S. Pat. No. 5,149,140 issued Sep. 22, 1992 to Mowry et al; and in U.S. Pat. No. 5,487,567 issued Jan. 30, 1996 to John R. Volpe. All of these patents disclose various means for providing methods and products to enable copies of documents to be distinguished from the originals, as for example, by a "large dot-small dot pattern", a "close line-spaced pattern", and images or indicia which are screen printed at minutely varied spaces and/or angles on the originals and are intended to produce a highly visible moiré pattern effect on the unauthorized copies. In this specification, the words "print", "printed" and "printing" are used to refer to the making of an original document by transferring an image using hand drawn press prints, painting, or digitally transferred through analog and digital photography and in addition, through video, Digital Versatile Disc (DVD) and Compact Disc (CD) technology. The words "copy" and "copying" to refer to making copies from an original.

A significant commercial use of security images is in commercial paper, such as personal checks. Personal checks conventionally originate from a particular banking institution and often bear one or more security images, either latent images or non-latent images, associated with the originating banking institution. When a personal check is presented to another banking institution for payment of a debt, the paper copy of the check is typically returned to the originating bank, which may use the security images to verify that the check is a valid check. However, under a new U.S. Federal Reserve regulation called "Check 21", effective in October 2004, banks at which checks are deposited are no longer be required to return the original paper check to the bank on which the check has been drawn. Instead, the originating bank receives only electronic images or scans of its checks from the banks at which the checks have been deposited. This regulation is expected to allow a considerable savings in transaction costs for the banking industry by avoiding the need to sort and mail the paper checks to their originating bank.

However, security images contained on conventional commercial paper, such as original checks, do not survive the scanning process, i.e. they are not reproduced in the scanned copy of the original check. Accordingly, the originating bank cannot effectively verify if the check presented to the depositing bank is a valid check. The difficulty in verifying the authenticity of a presented check raises significant concerns over the potential for increased check fraud once the new "Check 21" regulation goes into effect. While Check 21 significantly speeds the handling and collection of checks, the potential for enormous unprosecutable check fraud losses is nearly certain, as the conversion process destroys the evidence of fraud in most cases. To counter such fraud in a cost-effective manner, it is desirable to have image-survivable security technology as a feature or features that can be authenticated using images already captured as a normal part of the sorting process. Such a solution would require no additional expenses or modifications to the different hardware platforms already in place.

However, the current security images on conventional commercial documents do not survive the scanning process of the conventional scanners used in the banking industry. The banking industry uses relatively high speed, low-resolution scanners. A digital bit map image of the commercial paper is typically obtained and stored. The scanner is unable to distinguish the security image and hence does not reproduce the security image in the digital bit map image of the commercial paper.

Accordingly, there is a need to provide a security feature that serves to distinguish a copy of a document from an original and is able to survive the scanning process on the current generation of check processing equipment used by the banking industry.

Another significant commercial use of security images is in coupons and gift certificates issued by retailers, to prevent fraudulent copying. Currently, such documents must be created by a specialist using printing or lithography and/or high-quality paper, thereby raising the cost of the documents. There exists a need for the ability to inexpensively create original documents having security features on a digital printer using plain paper.

Another significant commercial use of documents having security images is in currency, traveler's checks, and laminate (films). To avoid counterfeiting and to provide fast and accurate authentication of such documents, ultraviolet or infrared hidden security images, using anywhere between one and four or more colors have been employed. However, a need exists for hidden images that provide greater security than those currently available.

SUMMARY OF THE INVENTION

It is an object of the present invention to overcome the above problems and provide enhanced security for documents and laminate films.

In one aspect of the present invention, a document or laminate film comprises a latent security image, which may be least partially invisible to the naked eye and may be visible when the document is reproduced after being scanned by a standard commercial bank scanner. The security image comprises a plurality of lines, dots, spots, or indicia having a frequency and a density such that the image is reproduced after being scanned by a modern reproduction machine. For example, security image lines have a line frequency between about 50 lines per inch and about 105 lines per inch, and a density between about 10% and about 80%. The hidden image may include a warning message, code, picture, portrait, design or indicia or may generate a distortion, solid color or colors, color shift, moiré skewed image, or omission when the document is reproduced by a modern reproduction machine.

In another aspect of the present invention, the document further includes a background that is not visible when the document is reproduced after being scanned by a standard commercial bank scanner. The background includes a plurality of lines, the background lines having a line frequency and a density such that the background is not reproduced after being scanned by a standard commercial bank scanner. The background lines may have a frequency less than about 25 lines per inch or greater than about 105 lines per inch, and a density less than about 10% or greater than about 80%. The background lines may be printed at a different angle than the lines of the security image. The first set of lines may be formed as a plurality of sets of lines, each set of lines being a different color and having a density of about 50%.

In a further aspect of the present invention, the document further employs a covert security icon incorporated into the document background. This image cannot be seen by the human eye, yet when it is scanned by the high-speed document imaging equipment, it appears in an unobtrusive section of the resulting document image. The recipient of this image can then be assured that they are looking at an authentic document.

In still a further aspect of the present invention, the security image includes a plurality of sets of lines, each set being a different color. The security image may include two sets of lines, each set of lines being a different color, each set of lines having a density of about 50%.

According to a further aspect of the present invention there is a method of making a reproducible document or laminate film comprising a security device, the method comprising generating the document containing the security device as a digital file, and the transfer of the document or laminate film by any means—whether hand drawn, via a press printer, painted or digitally transferred.

The method further comprises forming a first set of lines on the document, the first set of lines having a line frequency and a density such that a first image is reproduced after being scanned by the standard commercial bank scanner; and forming a second set of lines on the document, the second set of lines having a line frequency and a density such that a second image is not reproduced, or is only partially reproduced, after being scanned by the standard commercial bank scanner. In addition, the method comprises printing the document using a digital press printer (desktop, inkjet etc) or color copier.

According to still a further aspect of the present invention, generating the document comprises creating an original containing the security device, copying the original to a digital computer using a conventional scanner or digital camera, converting the copied original to a digital image file, such as a JPEG or eps file, which is printable via the printing step and sending the file over the internet. In one aspect of the present invention, the original comprises first and second sets of lines, dots or spots oriented at a first and a second angle, respectively, and the method comprises scanning the original at a third angle different than the first and second angles.

According to still a further aspect of the present invention, there is a document or laminate film including a security image that is not visible under ordinary light, and is visible when the document is exposed to a predetermined type of light source that matches the printed image. The security image may be printed with an ink visible only under one of UV light, infrared light, X-rays or Gamma rays and may also viewed with a matching reader.

According to another aspect of the present invention, the security image comprises a plurality of lines, the lines having a pattern such that the security image is visible only when viewed using a reader having substantially the same pattern of lines as the security image and utilizing a light source that matches the printed image. The reader may include a substantially transparent substrate having substantially the same pattern of lines as the security image to be placed on top or shined onto the security image. In addition, the security image may include an artwork, the artwork having a pattern such that the security image is visible only when viewed using a reader having substantially the same artwork as the security image. The security image may be embossed or de-embossed, wherein the security image is visible by tipping the document while under the reader in the correct matching light source.

According to further features in preferred embodiments of the invention described below, there is a test pattern for determining survivable and non-survivable line frequencies of a scanning device, and for determining interfering, partially interfering and non-interfering line frequencies of the scanning device, the test pattern including a plurality of rows of blocks of lines, dots, spots or images, the blocks of each row having a different line frequency from about 25 lines per inch to about 400 lines per inch, each block of each row having a different line density from about 10% to about 80%;

According to still further features in preferred embodiments of the invention described below, the test pattern is scanned by the scanning device, an operator can examine a scanned copy to determine which blocks survived the scanning, and determine which blocks are interfering or non-interfering.

BRIEF DESCRIPTION OF THE DRAWING FIGURES

The accompanying drawings, which are incorporated in and form a part of the specification, together with the description serve to explain the principles of the invention. In the drawings.

DETAILED DESCRIPTION OF THE INVENTION

Scanner-Survivable Security Images

The banking industry has been trying to find a cost effective security feature that can survive the imaging process on the check processing technology currently in use. One embodiment of the present invention enables originating banks to assure the authenticity of the new electronic checks that will be become standard under the "Check 21" federal regulations. Significantly, no expensive software or hardware is necessary to utilize it. All that is necessary is for a bank's check printer to print a background pattern (referred to as a pantograph) on the face of the check that incorporates the principles of the invention. Thus, the banking industry will not have to convert or upgrade their current check processing equipment. Banks need only change the printing of the check itself by directing their check printers to incorporate the present inventive technique into the printing process. The fact that the banking industry will not have to invest in new and expensive software and hardware detection systems is a very important benefit of this embodiment of the present invention.

Conventional scanning devices scan documents in a geometric horizontal and vertical scan and input images to a CCD array, which produces pixels used to make a digital image. The term "scanning device" is used hereafter to refer to any device that performs an optical scan to obtain an image of a document, including photocopying and scanning equipment. Most copying and scanning equipment in use by the banking industry are high speed, low-resolution scanners that may scan thousands of checks each day. These scanners produce an image of the checks, generally a bit map image, and the image of the check is stored as the deposited copy of the checks. These commercial bank scanners, such as NCR scanners, generally scan at a frequency of about 70 to 300 dots per inch (dpi), average 100 dpi to 200 dpi.

In the scanning process, the latent (visibly hidden) images of existing documents generally appear white and are simply not reproduced as a security image in the scanned image. As a result, the usefulness of the security image to detect a fraudulent copy is greatly diminished, which may make it impossible to detect a fraudulent copy of a security document. The present invention provides a security image that is reproduced in the scanned image, allowing the document to be verified in the same manner as the original document.

Figure 1:
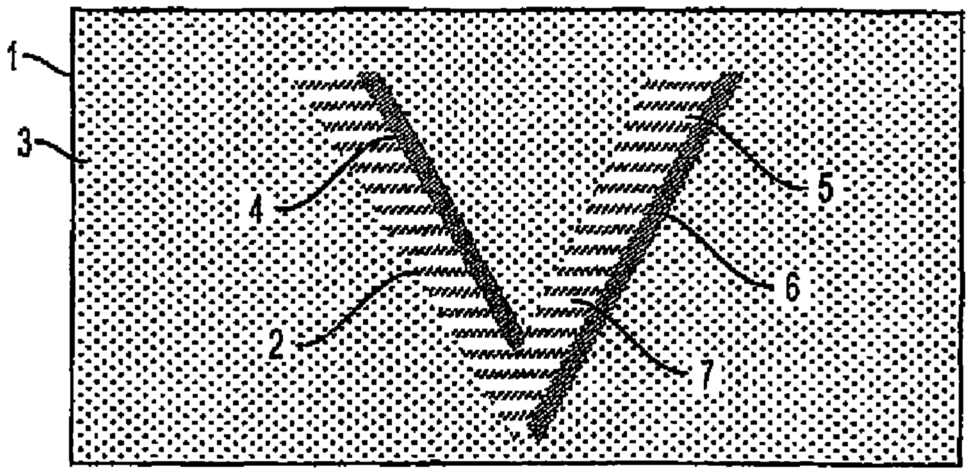
FIG. 1 illustrates a document having a latent security image according to an embodiment of the present invention.

Reference is now made to FIG. 1, which illustrates a document 1 having an image 2 that was produced in accordance with the principles of this invention. Document 1 can be any type of printed document, including a bank check, a security note, etc. Image 2 is formed by printing a plurality of lines. The term "lines" as used in this application, including in the attached claims, means solid lines, dots or spots or any other printing technique to form a line in an image, and the frequencies and densities discussed herein apply to lines, dots, or spots.

Image 2 is a latent security image; i.e., an image which is generally hidden to the human eye. In FIG. 1, a background area 3 is printed at a high line frequency, e.g. about 30-200 lines per inch (lpi). Latent image 2 is printed at lower line frequency between 25 lpi and 105 lpi at a density between 10-80%. When image 2 is scanned by a conventional commercial bank scanner, latent image 2 appears and the background 3 may be reproduced in a color that causes the background to fade away. Hence, latent image 2 survives the scanning operation.

In certain embodiments of the present invention, image 2 comprises lines 6 and 7, which come together at line 4. The densities of lines 6 and 7 are controlled by controlling the pitch (distance between lines), the thickness of the lines 6 and 7, and/or by controlling the density of the medium, such as ink, used to print lines 6 and 7. In an exemplary embodiment of the present invention, a density of 50% for each of lines 6 and 7 can be used, with a red color for line 6 and a green color for line 7. Typically, conventional bank scanners can scan all colors except yellow by converting them to a bit map and turning them to black. Therefore, lines of any color or combination of colors (except yellow alone) can be used in practicing this embodiment of the present invention. Also in an exemplary embodiment of the present invention, lines 6 and 7 may be printed at a different angle than used to print background 3.

Figure 5:
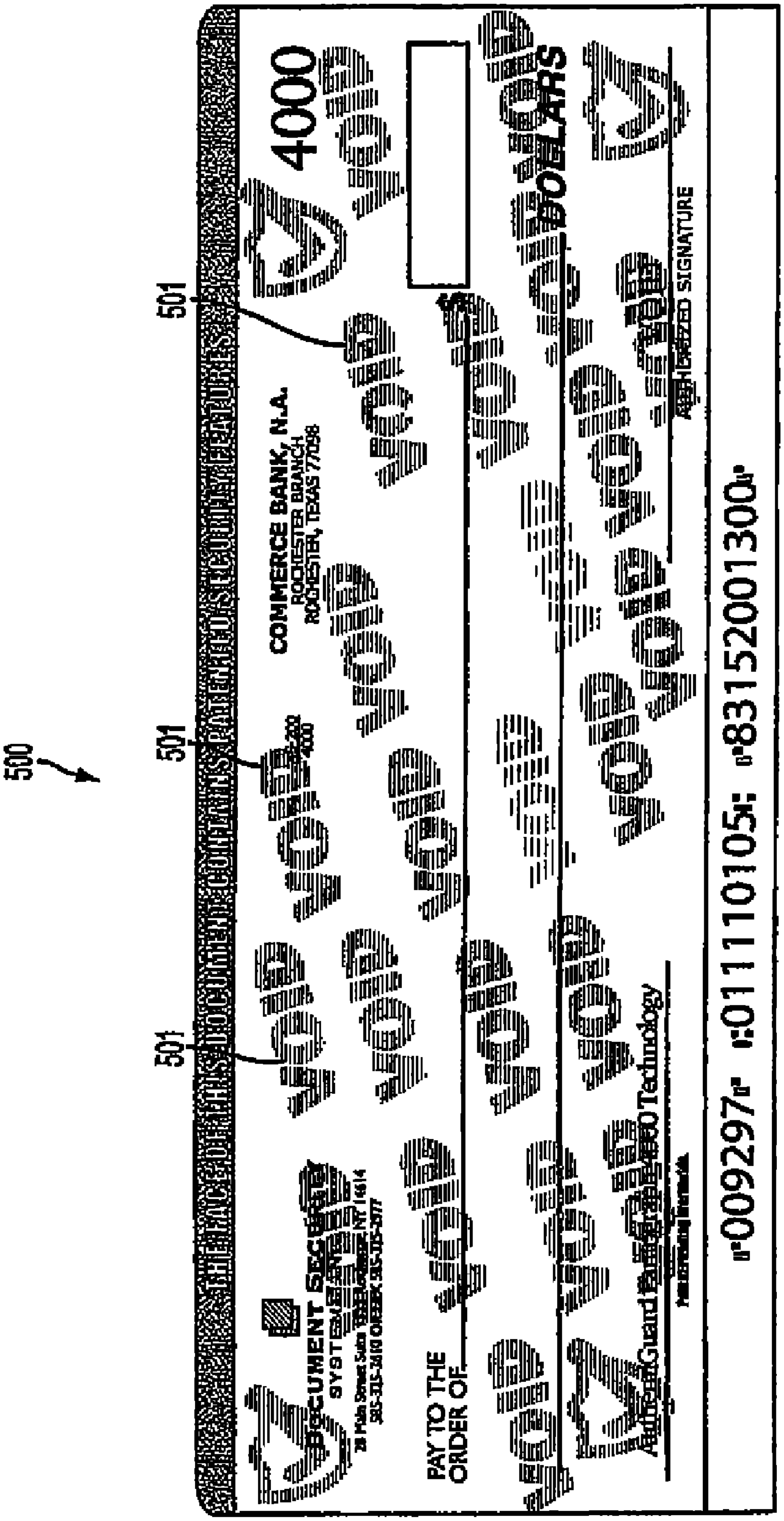
FIG. 5 is a scanned image of a bank check according to an embodiment of the present invention.

Reference is now made to FIG. 5, which is an example of a bank check 500 produced according to the embodiment of the present invention of FIG. 1. It contains security images 501 not easily visible to the human eye, which appear when check 500 is scanned using a standard bank scanner. In FIG. 5, the security images 501 appear; i.e., they survived the scan.

Figure 2:
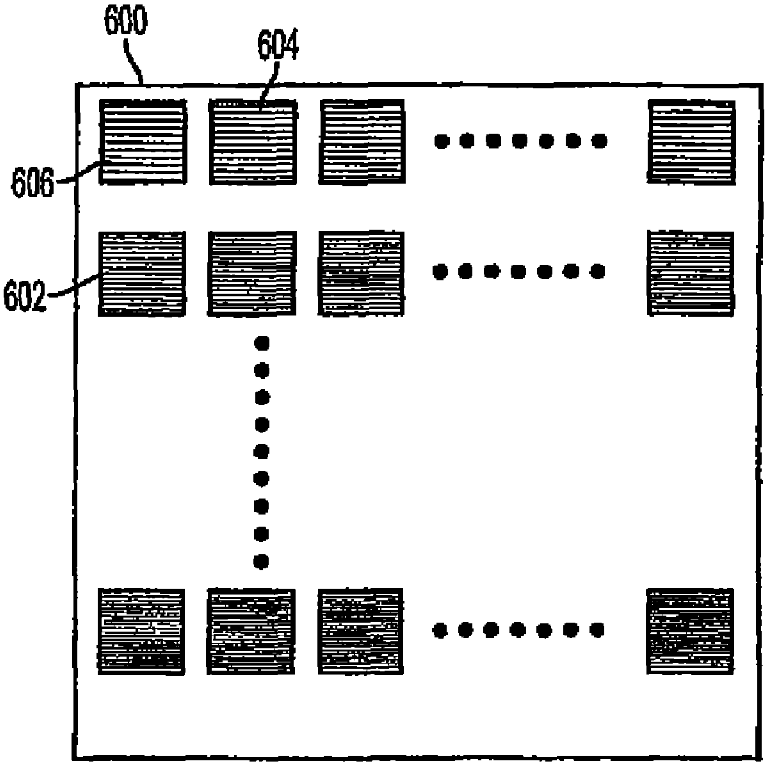
FIG. 2 is an exemplary test pattern that may be used to determine survivable and non-survivable frequencies of scanning devices.

Reference is now made to FIG. 2, which illustrates an exemplary test pattern 600 that may be used to determine survivable and non-survivable frequencies of scanning devices, and determine interfering, non-interfering, and partially interfering frequencies. Test pattern 600 has a plurality of rows 602 of different lines, dots, spots, or images having frequencies ranging, for example, from about 25 lpi to about 400 lpi, each row 602 having a separate line frequency. Each row 602 has a series of blocks 604 ranging in densities from, for example, about 10% to 80%. When test pattern 600 is scanned, the scanner operator can view the scanned copy to determine which line frequencies and corresponding densities provide a survivable image, and/or which frequencies provide interfering and non-interfering printed lines, dots, spots, images, artwork, or indicia. The line frequencies and density that provide a survivable image may be used as the frequencies and densities for a latent security image. Accordingly, even if conventional scanning devices are modified in a manner which alters their current survivable frequencies, newly created survivable scanning frequencies may be readily identified.

Digital Security Images

In another embodiment of the present invention, images comprising lines, dots and spots are digitally created as a file or picture or a vector image, such as a conventional JPEG file, which can be output possibly via the internet to an ordinary digital printer for use as a security image to protect or identify a security document, such as a coupon or gift certificate.

This embodiment of the present invention enables images comprising lines, dots, spots, artwork, indicia, or any other kind of image to be digitally created as a file or picture or a vector image, which can be output possibly via the internet to an ordinary digital printer for use as a security image to protect or identify a security document, such as a coupon, gift certificate, valuable document, on-demand passport, ID card, driver's license, currency, etc. This embodiment of the present invention allows secure original documents to be produced at a fraction of the current cost of such documents.

When a picture, currency, or a press-printed magazine is copied by a color copier, the copy generally comes out perfectly. The color laser copier not only uses a laser light to illuminate the printed image, but also uses a CCD array to see the image. The output of the image is not in conventional dot screens at different angles for each color to avoid a moiré pattern (as is typically done to include security features in security documents), but rather in continuous lines for each color, all printed on top of each other. All four toner colors used by the printer are printed at the same angle. Thus, if a color copy is viewed under magnification, the yellow, magenta, cyan, and black toner is seen printed in lines all in register on top of each other. The color laser copier converts the dot images to lines, eliminating the printed images with lines at different angles to each other commonly included in documents as security features. For example, if certain bank checks are viewed under magnification, it can be seen that the word "VOID" is printed in lines at 0 degrees and the background line screen is at 45 degrees. When a color copy is made, the VOID words show on the copy because the frequencies interfere with the copier scanning system. If the copy is viewed under magnification, it can be seen that all of the line screens of the words and the background were converted to lines all at the same angle.

It follows that, if such a bank check were created as an original computer file (e.g. as a conventional JPEG file) and printed out to a laser color copier, all of the lines in the words and background would be converted to lines all in the same direction and at all the same frequencies. Color copiers print at 200 lines per inch at only one angle, while security documents use multiple frequencies and angles. Thus, an output of conventional security images from a computer file to a laser printer is converted to the copier's 200 lines per inch, each color printing at the same angle, making the security technology ineffective. In other words, such a document could be electronically copied without the VOID words appearing.

The present invention enables security images to be created as a vector base image JPEG picture by scanning the images at certain angles and diffusing their focus, or creating the security images as original files (i.e., as documents) such that they can be printed out to a color copier and still be effective. The color copier sees a colored picture instead of line screens at different angles with computer specs and language attached to it. Therefore, using the inventive technique, even though the JPEG picture is converted to 200 lines per inch resolution with all colors running at the same angle, the original picture's color stays intact, making the output an effective security feature.

Figure 3:
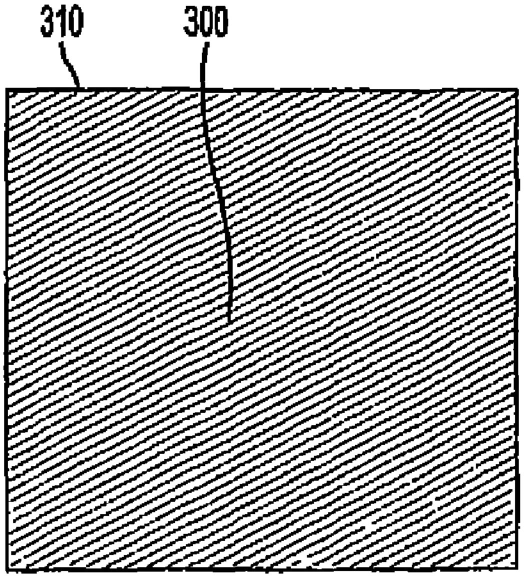
FIG. 3 illustrates another document with a latent image.

Examples of this embodiment of the present invention will now be described with reference to FIGS. 3 and 4. A conventional security image usable as an original with this embodiment of the present invention is shown in FIG. 3. The "donut" image 300 shown in FIG. 3 is made using a particular line frequency (such as 100 lines per inch), at a first angle (such as 135 degrees), and the area 310 around donut 300 is at a second angle (such as 90 degrees). The original image can be created at a particular density, e.g., 50 percent density, and printed in positive form in cyan on one press cylinder. A second image can be printed as a negative from the positive, also at 50 percent in density, on a second press cylinder, in the color magenta.

Another example of a conventional security image usable as an original with this embodiment of the present invention is one where a portrait contains a hidden image. The "George" image shown in FIG. 4 is printed at 285 lines per inch at 50% in density in cyan, while a hidden flag image (not shown) is at 5 degrees, and the surrounding area is at 135 degrees on the first press cylinder. The flag image is hidden until a reader having the same lines as this hidden image is placed over the image. Alternatively, an embossment or de-embossment to the image will allow the hidden image to appear in negative or positive form when the security image or document is tipped to the light. Also, a printed reader device can be laminated to the original security printed product, which can be tipped to verify the originality of the document.

Alternatively, the George image can be printed at 285 lines per inch at 35% density at 135 degrees around the flag image, which is printed at 5 degrees. The flag image is printed within George in the same color as George, and the negative or positive image is printed with the same angles as, or slightly different angles from, the first image, but using lines, dots or spots that fall in between the first colored security image (printed in the same or a different color).

Figure 4:
FIG. 4 illustrates another document with a latent image.

Note that the images of FIGS. 3 and 4 can also be made by painting them with computer software, or making them as a vector file image, without having to create them and then press-print them. These images can be imaged or printed in any matter and used on any substrate.

According to the inventive methodology, after an original has been made, it can be used as-is, or scanned in using a conventional flat bed scanner or the like at angles that are different from the original angles in the printed original. The images are then opened up in a conventional software program, such as Photoshop, to view the images. Enlarging the images will show that all of the original line and dot screen images are still intact. The file can then be converted into a JPEG, eps, or similar file and printed out to a digital press, desktop printer, or color copier.

Thus, an original document used with this embodiment of the present invention can include security images, verifiable images, and/or images that are produced digitally, hand drawn, painted, or created in any other way. The security images may be visible, invisible, or partially visible to the naked eye under normal light wavelengths, and contain lines, dots, spots, indicia and/or a combination thereof. Moreover, designs, pictures, or indicia can be tagged with security images to identify an original document to its originator.

The process and product of this embodiment can contain images of lines, dots, spots, indicia, pictures, portraits and information, and images containing hidden images, that when reproduced by any modern reproductive machines (such as laser color copiers, scanners, desk top publishing systems, high speed commercial scanners, facsimile machines, photographic equipment, digital camera, optical, digital and video opticon reproductive equipment) result in a reproduction revealing a hidden warning message, code, picture, portrait, design, or indicia, a reproduction of major distortion, color shifts, moiré skewed images and omissions. Reproductions of an original may result in a complete block-out of the original on the reproduction, where the whole reproduction may come out as a solid color or multiple solid colors on the copy or a portion thereof. Reproductions of an original may also result in a copy containing "shifted" single color images, such as those produced by a Konica color copier.

Invisible Security Images

In this embodiment of the present invention, security images made up of lines, dots and/or spots are printed with ultraviolet (UV), infrared, or any other ink invisible to the naked eye, and are therefore invisible under ordinary (i.e., visible) light. When viewed under a predetermined type of light, such as UV light, the images reveal a glowing area. The lines of the security device have a pattern such that, to view the hidden security image in the glowing area, a reader device is required, such as a flat transparent sheet having the same pattern of lines, dots, or spots as the hidden security image. The reader device may alternatively have a pattern on it that is close to that of the security image, or an integer number of spacings per inch. Placing the reader device over the security image while viewing it under the predetermined type of light will cause the hidden security image to appear. The hidden image may also be seen by using an embossment or de-embossment, or by printing a visible or invisible line, dot, spot, indicia, or artwork image over the security image in visible or invisible inks, dies or pigments. Thus, this embodiment of the present invention raises the security of the document by making counterfeiting more difficult.

In one example of this embodiment, an image such as a portrait is printed in UV ink in a first color, and a hidden security image such as the number "100" is printed in UV ink in a second color across the forehead of the portrait, in lines, dots or spots using conventional techniques, such that it cannot be seen under UV light unless a reader device is placed on top of the "100" while viewing it under UV light. Alternatively, the hidden security image can be printed in the same color as the main image, or in multiple colors in negative or positive form, or in lines, dots or spots such that it cannot be seen under UV or any other invisible printed image light unless a reader device is placed on top of it while viewing it under the image light.

The reader can be a reproductive machine such as a copier, scanner, video, digital camera or opticon, or a film or plastic lens with substantially the same images as the security image in shape, angle, or frequency; an embossment, deembossment or laminate containing the same; or a duplicate of the same made in the above manner. The reader is placed over the top of, or shined onto, the printed image to reveal the hidden security image, portrait, barcode, indicia, picture, etc. These images can be made up of lines, dots, spots, or combinations thereof, indicia, portraits, artwork, the same image, etc.

In other embodiments of the present invention, the security image is printed with an ink visible only under infrared light, X-rays or Gamma radiation, rather than UV light and long or short wave.

These embodiments of the present invention enable enhanced security to be incorporated into documents such as currency and laminate films. Their use is advantageous in that a counterfeiter would not know that the hidden security image even exists unless they had the reader device and the correct light source.

Those of skill in the art will appreciate that a variety of images may be printed in accordance with the principles of the present invention to prevent unauthorized copying of those images. For example, the present invention may be used to print currency so that the currency could not be scanned and color separated to thwart counterfeiting efforts. Artwork, such as prints and posters, may also be printed in accordance with the principles of the present invention to thwart unauthorized copying, duplication or use of the artwork. The principles of the present invention may also be used to print security images, including latent security images, which may be used on a variety of documents, including identification cards, drivers licenses, currency, and laminate films.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes that come within the meaning and range of equivalency of the claims are therefore intended to be embraced therein.

The invention claimed is:

1. A document comprising:

a latent security image which is visible when the document is reproduced after being scanned by a standard commercial bank scanner;

the security image comprising a plurality of lines, the lines having a line frequency and a density such that the image is reproduced after being scanned by the standard commercial bank scanner, and the security image lines having a line frequency between about 25 lines per inch and about 105 lines per inch and a density between about 10% and about 95%;

a background which is not visible when the document is reproduced after being scanned by the standard commercial bank scanner; and the background comprising a plurality of lines, the background lines having a line frequency and a density such that the background is not reproduced after being scanned by the standard commercial bank scanner, the background lines having a frequency less than about 25 lines per inch or greater than about 105 lines per inch and a density less than about 10% or greater than about 95%, and, the background lines being printed at a different angle than the lines of the security image.

2. The document of claim 1, wherein the security image comprises a plurality of sets of lines, each set being a different color, and wherein the security image comprises two sets of lines, each set of lines being a different color, each set of lines having a density of about 50%.

3. A method of making a document comprising a latent security image which is visible when the document is reproduced after being scanned by a standard commercial bank scanner, the method comprising:

forming a first set of lines on the document, the first set of lines having a line frequency and a density such that a first image is reproduced after being scanned by the standard commercial bank scanner;

forming a second set of lines on the document, the second set of lines having a line frequency and a density such that a second image is not reproduced, or is only partially reproduced, after being scanned by the standard commercial bank scanner;

forming the first set of lines to have a line frequency between about 25 lines per inch and about 105 lines per inch, and a density between about 10% and about 95%;

forming the second set of lines to have a frequency less than about 25 lines per inch or greater than about 105 lines per inch, and a density less than about 10% or greater than about 95%; and forming the first set of lines at a different angle on the document than the second set of lines.

4. The method of claim 3, comprising forming the first set of lines as a plurality of sets of lines, each set of lines being a different color and forming the first set of lines as two sets of lines, each set of lines being a different color and having a density of about 50%.

5. A document comprising:

a latent security image which is visible when the document is reproduced after being scanned by a standard commercial bank scanner;

the security image comprising a plurality of lines, the lines having a line frequency and a density such that the image is reproduced after being scanned by the standard commercial bank scanner, and the security image lines having a line frequency between about 25 lines per inch and about 105 lines per inch and a density between about 10% and about 80%;

a background which is not visible when the document is reproduced after being scanned by the standard commercial bank scanner;

the background comprising a plurality of lines, the background lines having a line frequency and a density such that the background is not reproduced after being scanned by the standard commercial bank scanner, the background lines having a line frequency greater that the line frequency of the security image up to about 200 lines per inch.

6. The document of claim 5, wherein the security image comprises a plurality of sets of lines, each set being a different color, and wherein the security image comprises two sets of lines, each set of lines being a different color, each set of lines having a density of about 50%.

* * * * *